United States Patent [19]
Pozniak et al.

[11] 3,940,928
[45] Mar. 2, 1976

[54] AIR DIVERTER VALVE

[75] Inventors: Donald J. Pozniak, Sterling Heights; Robert M. Siewert, Birmingham, both of Mich.

[73] Assignee: General Motors Corporation, Detroit, Mich.

[22] Filed: Feb. 11, 1974

[21] Appl. No.: 441,396

[52] U.S. Cl. .................. 60/289; 137/117; 137/500; 60/290
[51] Int. Cl.² .......................................... F02B 75/10
[58] Field of Search ........ 60/274, 289, 290; 251/58, 251/305, 314, 61; 137/117, 501, 502, 503, 500

[56] References Cited
UNITED STATES PATENTS

| | | | |
|---|---|---|---|
| 2,182,933 | 12/1939 | Schimanek | 137/502 |
| 2,459,000 | 1/1949 | Morris | 137/501 |
| 2,650,607 | 9/1953 | Bryant | 137/501 |
| 3,059,419 | 10/1962 | Schnabel | 60/290 |
| 3,360,927 | 1/1968 | Cornelius | 60/289 |
| 3,641,767 | 2/1972 | Kraus | 60/274 |
| 3,748,855 | 7/1973 | Day | 60/290 |
| 3,791,146 | 2/1974 | Hayashi | 60/289 |
| 3,805,522 | 4/1974 | Sheppard | 60/290 |
| 3,818,933 | 6/1974 | Bubniak | 137/503 |
| 3,892,071 | 7/1975 | Garcea | 60/288 |

*Primary Examiner*—Douglas Hart
*Attorney, Agent, or Firm*—C. K. Veenstra

[57] ABSTRACT

In an emission control system having an air pump for delivering air to the exhaust system of an internal combustion engine, a valve controls the air pump discharge pressure in a fixed relationship to exhaust pressure by diverting a portion of the air pump discharge air flow. As a result, the flow of air from the pump to the exhaust system is maintained as a constant proportion of the engine air flow.

2 Claims, 5 Drawing Figures

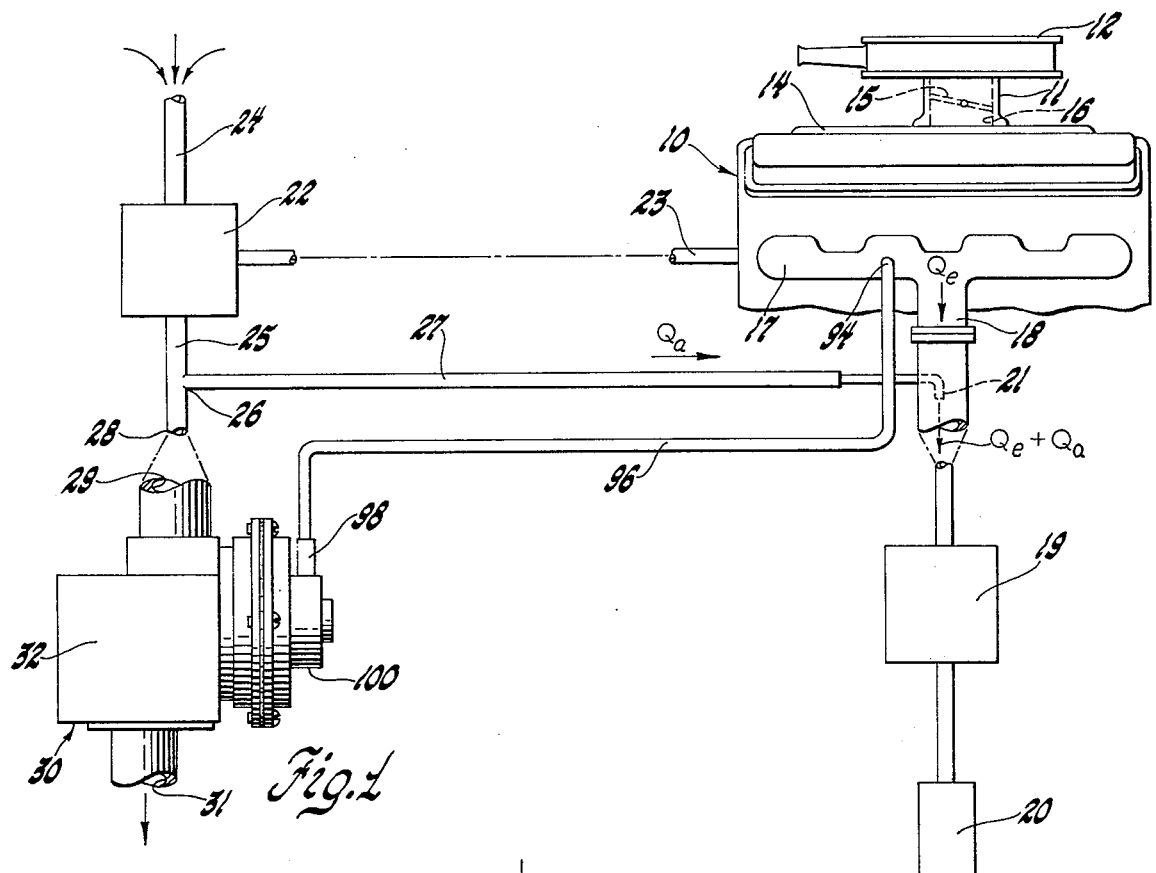
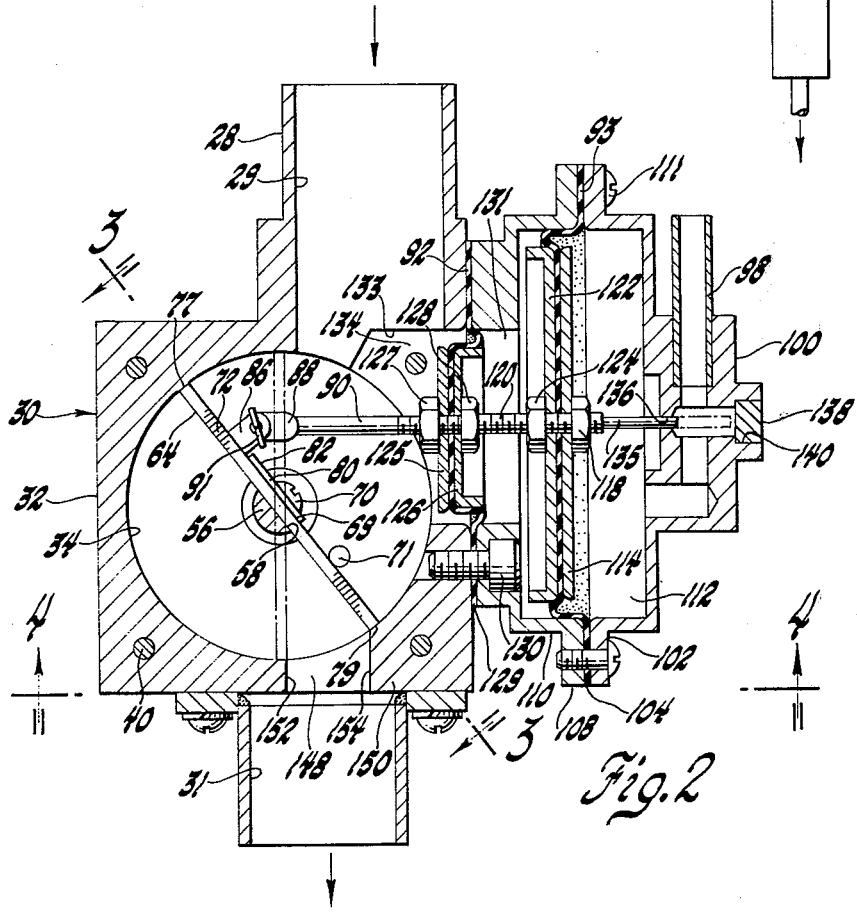

U.S. Patent  March 2, 1976  Sheet 2 of 2  3,940,928
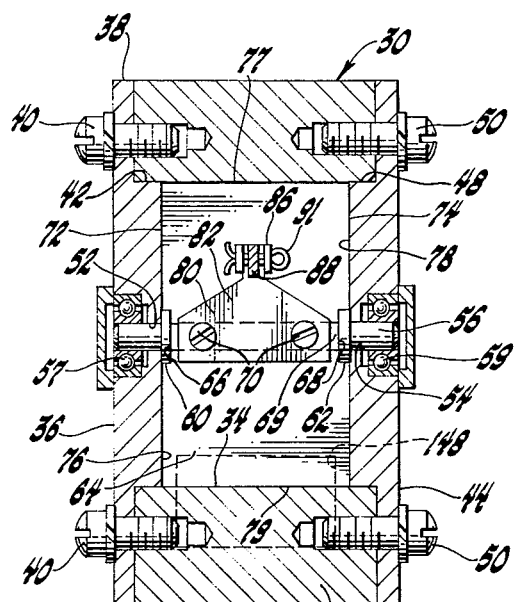
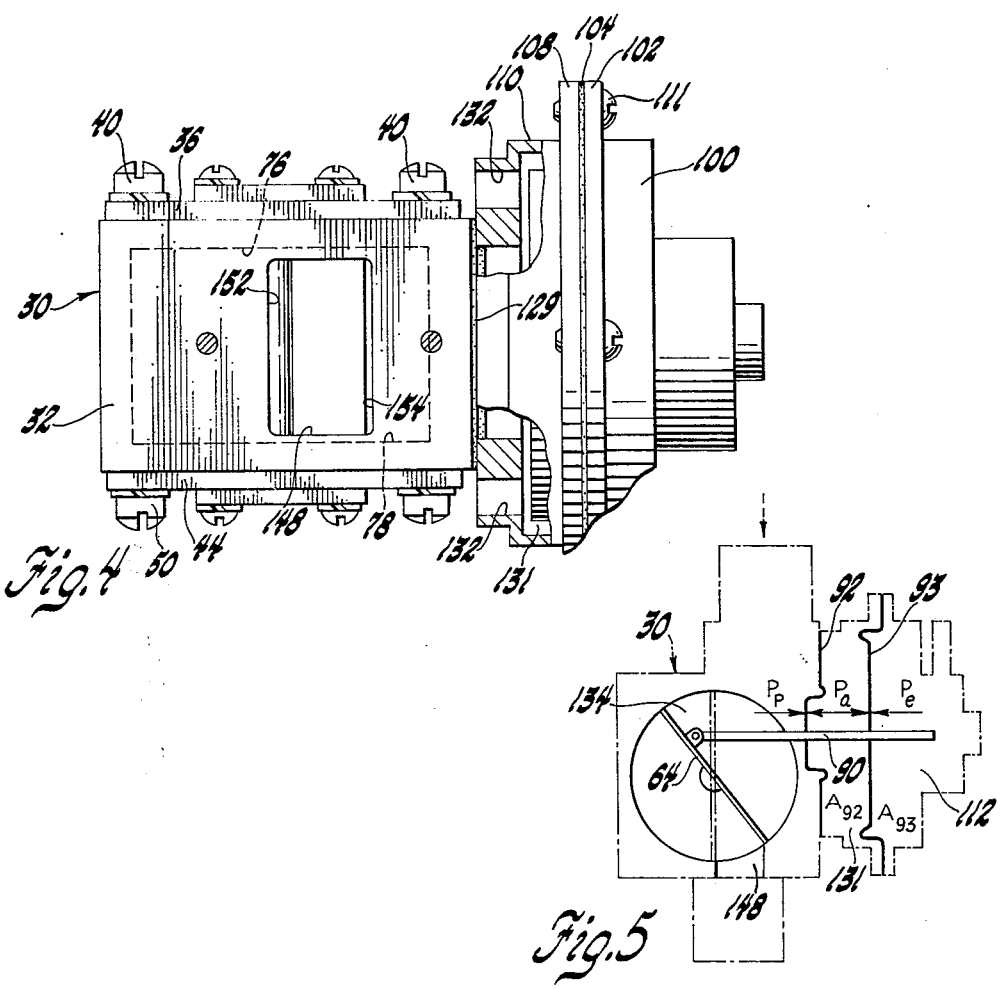

AIR DIVERTER VALVE

This invention relates to a system having an air pump for delivering air to the exhaust system of an internal combustion engine and, more particularly, to a control valve which regulates the air pump discharge pressure by diverting part of the air flow to the atmosphere.

Increased emphasis has been placed on reducing the portion of unburned constituents, such as hydrocarbons and carbon monoxide, present in the exhaust gases discharged from internal combustion engines. One of the most effective arrangements devised to accomplish this reduction is a system wherein additional air is injected into and mixed with the exhaust gases to complete oxidation of exhaust hydrocarbons and carbon monoxide in post-combustion reactions external to the engine. It is common practice to use a separate positive displacement air pump driven by the engine for this air injection. In some such applications, it has been found desirable to proportion this secondary air flow to the primary engine air flow.

In U.S. Pat. No. 3,785,152 a pressure operated control valve is described which throttles the inlet to such an air pump to regulate secondary air flow. However, the design of the air inlet on many air pumps would make inlet throttling in this manner difficult without extensive modification. Also, it is possible to damage an air pump by overheating if the air flow is greatly throttled in this manner.

Other approaches for the control of injection air flow would be to restrict or divert a portion of the air pump discharge flow. Restricting the discharge, however, would increase the power requirements of the air pump and the possibility of overheating. Alternatively, diverting a portion of the air pump discharge flow maintains full capacity air flow through the air pump even through only a portion of the discharge flow is used for air injection. Less air pump power would probably be required as compared to the restricted discharge approach, and overheating would be precluded. Thus, air flow regulation can be achieved by diverting a portion of the air pump discharge flow.

Discharge-controlling diverter valves are currently available for this type of application. For example, a pressure relief device, carried by the air pump, may divert a portion of the air pump discharge flow when a predetermined pressure is exceeded. Since the discharge pressure of an engine driven positive displacement air pump increases with engine speed, the pressure relief valve limits air injection at high speeds. However, these valves do not proportion the secondary air flow to the primary air flow.

It is a principal object of the present invention to provide an air diverter valve whereby air flow to the exhaust system can be effectively regulated as a proportion of engine air flow.

Another object of the invention is to provide an air diverter valve for use with an exhaust emission control system for continuously regulating the secondary air flow to the exhaust system in accordance with the difference between the air pump discharge pressure and the pressure in the exhaust system to provide an injection air flow in constant proportion to the engine air flow.

These and other objects and advantages of the present invention are attained in an emission control system having an air diverter valve and an engine driven positive displacement air pump. The discharge of the pump is determined by engine speed and the amount of secondary or injection air flow to the exhaust system is controlled by the diverter valve which has, in the preferred embodiment, a rectangular valve plate for uncovering a discharge port to the atmosphere. The valve plate is actuated by a pressure responsive servomotor having a pair of unequal size diaphragms, which are respectively responsive to pump discharge and exhaust pressures. This combined responsiveness is critical in establishing the desired relationship between exhaust gas flow and injection air flow. It regulates the diverter valve in a novel manner which causes the valve to divert a portion of the pump discharge air flow to the atmosphere in accordance with the difference between pump discharge and exhaust pressures.

In summary, the present invention provides having an air diverter valve for controlling the discharge of an air pump to an engine exhaust system. This invention differs from the above-mentioned devices in that the air diverter valve regulates the secondary or air injection flow in linear relationship to primary engine air and exhaust flow. This is accomplished by diverting the excess air pump discharge flow to the atmosphere in a predetermined manner in which the position of the diverter valve is governed by the difference between the pump discharge pressure and the engine exhaust pressure.

We have set forth herein a diverter valve assembly which has a cylindrically bored housing and a rectangular valve plate rotatably disposed in the bore. The plate is actuated by a servomotor having a pair of unequal diaphragms which partition the motor into two sealed pressure chanbers and an intermediate atmospheric chamber. One of the chambers is exposed to pump discharge pressure occuring in the bore upstream of the plate and the other chamber is exposed to the exhaust system pressure. These pressures have the combined effect of actuating the plate so that it traverses a port opening from the housing to the atmosphere to divert a portion of the air flow to the atmosphere and thus proportion the pump discharge pressure to the exhaust system pressure. The injection air flow is thereby proportioned to engine exhaust flow and a constant proportional relationship between injection air flow and exhaust flow is maintained. This has been shown to be advantageous in supporting oxidation of undesirable emissions in the exhaust system.

This regulation of injection pressure and injection air flow is provided by the diverter valve in a manner which uses the difference between air pump discharge pressure and exhaust pressure to actuate the diverter valve. It is well known that engine exhaust pressure is a function of exhaust volumetric gas flow and that air pump discharge pressure is a function of engine speed (in an engine driven positive displacement pump). This invention works in the following manner: as engine load increases and the throttle is opened to permit larger engine air flow and thus maintain a constant engine speed, the resulting larger exhaust gas flow causes increased exhaust pressure in the exhaust system. The increased difference between air pump discharge pressure and exhaust pressure is used as the signal to the value actuating means. In response thereto, the valve plate covers an increased portion of the valve discharge port to divert less air flow to the atmosphere. Accordingly, more air is supplied to the exhaust system to combine with the exhaust flow. However, as the pump discharge pressure increases and exhaust pressure remains constant, this reduces the pressure difference therebetween and causes the valve actuation means to move the valve plate to uncover the discharge port. Accordingly, more air is diverted to the atmosphere and less air will be injected to the exhaust system. A predetermined equilibrium position of the valve plate with respect to the discharge port will be established whereby injected air flow to the exhaust system is maintained in constant proportion to exhaust gas flow.

For a better understanding of the invention, reference should be made to the following detailed description of the invention to be read in connection with the accompanying drawings, wherein:

FIG. 1 is a schematic illustration of an internal combustion engine having an exhaust emission control system associated therewith, the system including an engine driven positive displacement air pump having its discharge flow controlled by an air diverter valve in accordance with the invention;

FIG. 2 is an enlarged axial sectional view of the air diverter valve of FIG. 1;

FIG. 3 is a sectional view taken along lines 3—3 of FIG. 2 showing further details of the valve;

FIG. 4 is a view taken along lines 4—4 of FIG. 2 and having parts broken away showing the rectangular outlet traversed by the valve plate and the openings to the atmospheric pressure chamber; and FIG. 5 is a schematic of the air diverter valve illustrating the functional parts and nomenclature used in the discussion.

Referring now to FIG. 1, an internal combustion engine 10 is provided with a carburetor 11 and an air cleaner 12 mounted thereon to supply an air-fuel mixture to the intake manifold 14 of the engine, primary air flow through the carburetor to the engine being controlled by a throttle valve 15 pivotal within the induction passage 16 of the carburetor. An exhaust manifold 17 receives the exhaust gases from the cylinders (not shown) and defines a flow path for the combustible exhaust gases discharged therefrom. Each exhaust manifold 17 is connected to an exhaust pipe 18 which in turn is connected to a thermal reactor or converter 19 and a muffler 20. Thermal reactor 19 is preferably in the form of an insulated reaction chamber in which engine exhaust gases are exothermically reacted to reduce the amount of undesirable exhaust constituents, as set forth in U.S. Pat. No. 3,754,398, Mattavi.

Upstream of reactor 19 and disposed within exhaust pipe 18 is an air supply tube 21 connected to an air pump 22. The air supply tube 21 delivers air which mixes with the engine exhaust gases to support combustion of the unburned exhaust gas constituents in reactor 19.

An engine-driven positive displacement air pump 22 delivers clean air to air supply tube 21 for injection to exhaust pipe 18 and reactor 19. The air pump is driven by the crankshaft 23 of the engine through a belt and pulley arrangement (not shown), as is conventional. Air enters air pump 22 through an air inlet port 24. The discharge port 25 of air pump 22 is connected to a branched conduit 26 having one portion 27 extending to air supply tube 21 for providing air flow thereto. The other branch 28 of conduit 26 extends to the inlet port 29 of a diverter valve assembly 30.

The diverter valve 30 controls the amount of air diverted from the normal flow path defined from air pump 22, through discharge port 25, branch 27 and air supply tube 21 to exhaust pipe 18 and reactor 19. The diverted air flow path is, in this case, from air pump 22, through discharge port 25, branch 28, and inlet 29 through valve assembly 30 and an associated throttle discharge port 31 to the atmosphere. Diverter valve 30 may be formed integral with air pump 22 or, as shown, as a separate unit connected to the discharge port 25 of the air pump in parallel with air supply tube 21.

The diverter valve 30 in the embodiment shown in FIGS. 2 – 4 includes a valve housing member 32 having a cylindrical central bore 34. Bore 34 is closed at one end thereof by a valve housing cover 36 which has an external flange 38 secured by means of screws 40 to the housing 32. As best shown in FIG. 3, the cover 36 includes an inwardly extending cylindrical portion 42 which fits in one end of the bore 34 to close the housing 32 on one end and forms a metal-to-metal seal between cover 36 and housing 32. The housing is closed at the opposite end by a valve housing cover 44 like cover 36. Thus, it includes a flange 46 engaging the other end of housing 32 and a cylindrical portion 48 received in the bore 34 as seen in FIG. 3. A plurality of screws 50 secure the housing cover 44 in place on the housing 32.

The housing covers 36, 44 have, respectively, central bores 52, 54 that receive opposite ends of a valve shaft 56 carried in a pair of bearings 57, 59. As best seen in FIG. 2, shaft 56 includes a flat surface portion 58 with a pair of spaced apart shoulders 60, 62 (FIG. 3) to supportingly receive a rectangular throttle or valve plate 64 having side notches 66, 68 which engage the shoulders 60, 62. A central portion 69 of plate 64 is seated against the flat surface 58 and secured thereto by means of screws 70. A pin 71 limits counterclockwise rotation of plate 64.

The valve plate 64 has side edges 72, 74 located in sliding sealing abutment with the inner flat surfaces 76, 78 on the housing covers 36, 44 respectively. The plate 64 further includes end edges 77, 79 that are located in sliding abutment with the inner cylindrical surface of the bore 34 between the housing covers 36, 44.

A metal yoke 80 is attached to valve plate 64 by means of screws 70 and forms a lever arm 82 defined between an upwardly turned bifurcated end 86 of yoke 80 and shaft 56. Bifurcated end 86 of the lever 82 is secured to a flat end 88 of a diaphragm rod 90 by a cotter pin 91.

The disphragm rod 90 is connected to a pair of flexible circular diaphragm elements 92, 93. As shown in FIG. 1, a signal port 94 opening from exhaust manifold 17 provides an exhaust pressure signal to diverter valve 30 through a signal line 96 having one end connected to port 94 and having the opposite end thereof connected to an inlet fitting 98 on valve 30. Referring to FIG. 2, fitting 98 is received in a diaphragm cover member 100. The diaphragm cover 100 includes a radially extending flange 102 in engagement with the periphery 104 of diaphragm 93. Diaphragm 93 is supportingly received at its periphery 104 by an associated radially extending flange 108 of an intermediate annular member 110 adapted for registration with housing 32 and cover member 100. A plurality of screws 111 secure cover member 100 to intermediate annular member 110.

Diaphragm 93 is sealed with respect to the cover member 100 to form an exhaust pressure chamber 112 therebetween. A washer 114 is secured to the diaphragm 93 by means of a nut 118 received on a threaded portion 120 of the rod 90. The opposite side of diaphragm 93 is supported by a plate 122 secured by a nut 124 received on threaded portion 120.

The lower diaphragm element 92 is supported in a similar manner by a cup-shaped washer 125, a plate 126, and nuts 127, 128 received on the threaded portion 120. A plurality of countersunk screws 130 secure intermediate annular member 110 to housing 32, thus securing diaphragm 92 therebetween at its periphery 129.

The cavity between diaphragms 92, 93 and within intermediate annular member 110 defines an atmospheric pressure chamber 131 that is in communication with ambient pressure through a plurality of bores 132 opening from the intermediate annular member 110 to the atmosphere as shown in FIG. 4.

The left side of diaphragm 92 communicates with bore 34 through a channel portion 133 formed in housing 32 which thus forms an air pump discharge pressure chamber 134.

As shown in FIG. 2 the right end of rod 90 has a small diameter extension 135 thereon supportingly received within a guide opening 136 in cover 100. A plug 138 is sealingly pressed into opening 140 after guide opening 136 is formed.

Pump discharge pressure chamber 134 on the left side of disphragm 92 is exposed to the superatmospheric pressure occurring upstream of plate 64 which is substantially the same as the pressure occuring at the discharge port 25 of air pump 22. Chamber 112 on the right side of diaphragm 93 is exposed to the pressure occurring in the exhaust manifold 17 as conveyed by port 94, conduit 96, and fitting 98.

Referring now to FIG. 4, a rectangular hole 148 is formed in wall 150 and opens to discharge port 31 of valve housing 32 to define a flow area for diverting a portion of the air pump discharge air flow to the atmosphere.

As shown schematically in FIG. 5, diverter valve 30 is a dual diaphragm servomotor having a central actuating rod 90 secured to the diaphragms for moving a valve plate 64 to control the amount of air flow diverted to the atmosphere. A smaller left diaphragm 92 has an effective area $A_{92}$ and a larger right diaphragm 93 has an effective area $A_{93}$.

The following analysis demonstrates that the object of the present invention, that is, the requirement of proportioning mass flow of injected air to mass flow of exhaust gas, is achieved by maintaining the pump pressure in chamber 134, $P_P$, proportional to the lesser exhaust pressure in chamber 112, $P_e$.

The static equilibrium equation describing this air diverter valve may be written as:

$$(P_e - P_a) \cdot A_{93} = (P_P - P_a) \cdot A_{92} \quad (1)$$

where $P_a$ is the ambient or atmospheric pressure (in chamber 131) intermediate diaphragms 92 and 93. Rewriting equation 1, $$\frac{P_e - P_a}{P_p - P_a} = \frac{A_{92}}{A_{93}} = K_2 \quad (2)$$

where $K_2$ is a constant of proportionality and the subscript 2 refers to the defining equation number.

$P_e - P_a$ and $P_p - P_a$ are gauge pressures for exhaust system pressure and pump outlet pressure, respectively, and will be defined as $P_{eg}$ and $P_{pg}$. Noting that it is the desired object to proportion hte mass of injected air flow, $Q_a$, to the mass of exhaust flow, $Q_e$, the following defining relation can be shown:

$$K_3 = \frac{Q_a}{Q_e} \quad (3)$$

Since the mixture of exhaust gas and secondary injected air must flow to the atmosphere, the following can be written:

$$P_{eg} = K_4 (Q_e + Q_a)^n \quad (4)$$

where $n$ is an experimentally determined constant usually having the value of about 2.0 for air.

The air flow through the secondary air supply or air injection system likewise follows the equation:

$$P_p - P_e = K_5 (Q_a)^n \quad (5)$$

or, in terms of pump gauge pressure, $$P_{pg} = (P_p - P_e) + P_{eg} = K_5 (Q_a)^n + K_4 (Q_e+Q_a)^n \quad (6)$$

Since we require that $Q_a = K_3 Q_e$ from equation 3, by substitution it follows that:

$$Q_e + Q_a = Q_e + K_3 Q_e = (1 + K_3) Q_e \quad (7)$$

with the result:

$$P_{pg} = (K_3)^n K_5 (Q_e)^n + K_4 [(1+K_3)Q_e]^n \quad (8)$$

or, equivalently, $$P_{pg} = K_9 Q_e^n \quad (9)$$

Through further manipulations using equations 7 and 4

$$P_{pg} = K_9 \left( \frac{Q_e + Q_a}{1 + K_3} \right)^n \quad (10)$$

$$= K_{11} (Q_e + Q_a)^n \quad (11)$$

$$= K_4 K_{11} P_{eg} \quad (12)$$

or finally $$P_{pg} = K_{13} \cdot P_{eg} \quad (13)$$

Therefore, it can be seen that the mass flow of injected air, $Q_a$, will be proportioned to the mass flow of exhaust gas, $Q_e$, when linear relationship is maintained between pump (gauge) pressure, $P_{pg}$, and exhaust (gauge) pressure $P_{eg}$.

It should be noted from FIG. 2 that the effective area of diaphragm 92 ($A_{92}$) is less than that of diaphragm 93 ($A_{93}$). This is necessary because pump discharge pressure must invariably be greater than exhaust pressure so that secondary air will flow from pump 22 to exhaust pipe 18 and not vice-versa. Accordingly, diaphragm 93, responsive to exhaust system gauge pressure $P_{eg}$, must have a larger effective area than diaphragm 92, responsive to pump discharge gauge pressure, $P_{pg}$, to compensate for this disparity. The constant $K_{13}$ appearing in equation 13 relates the exhaust and pump pressures linearly. By selecting diaphragms 92 and 93 so that $A_{93}/A_{92} = K_{13}$ (where $K_{13} = 1/K_2$), valve 64 will be positioned to make $P_{pg}/P_{eg} = 1/K_2$ and $Q_a/Q_e = K_3$.

In operation, as rectangular plate 64 is repositioned by rod 90, it traverses opening 148 thus varying the exposed discharge area. In the solid position shown in FIG. 2, diverter valve 30 is essentially fully closed which would prevent any air flow from air pump 22 from being discharged to the atmosphere through opening 148. As rod 90 moves rightwardly under the influence of increased pump discharge pressure or reduced exhaust pressure, valve plate 64 moves clockwise to the phantom valve opened position. (The extent of travel of the valve plate 64 between opened and closed positions is 30° in the preferred embodiment.) When valve is in its phantom open position, edge 79 thereon will coincide with leftmost edge 152 of opening 148 to permit a substantial amount of the air flow from air pump 22 to be discharged or diverted to the atmosphere. However, when valve plate 64 is in the solid line valve closed position shown in FIG. 2, edge 79 overlaps with rightmost edge 154 of opening 148 and essentially no air is diverted to the atmosphere.

The position of valve plate 64 and thus the amount of air flow diverted through opening 148 of diverter valve 30 will be determined by the proportioned air-to-exhaust flow requirements of the exhaust-reactor system in order to oxidize the unburned exhaust constituents. If, for example, the pump discharge pressure, $P_{pg}$, is less than the product of the constant $K_{13}$ (from Eq. 13) and the exhaust pressure, $P_{eg}$, diaphragms 92, 93 will move rod 90 and rotate plate 64 counterclockwise to divert less air to the atmosphere. This will increase the pump discharge pressure until the equality between that pressure and $K_{13} \cdot P_{eg}$ (Eq. 13) is reestablished. Conversely, if the pump discharge pressure, $P_{pg}$, should exceed $K_{13} \cdot P_{eg}$, diaphragms 92, 93 will move rod 90 and rotate plate 64 clockwise to divert more air to the atmosphere. This will decrease the pump discharge pressure until the equality between that pressure and $K_{13} \cdot P_{eg}$ (Eq. 13) is reestablished. Thus, it can be seen that a stable position of valve plate 64 will be established whereby the resultant forces acting on diaphragms 92, 93 and rod 90 are equilibrated. Accordingly, Eqs. 3 and 13 are satisfied so that injected air flow, $Q_a$, is proportioned to exhaust flow, $Q_e$. In this manner, diverter valve 30 continuously regulates the amount of air injected to the exhaust-reactor system by maintaining the pump discharge pressure, $P_p$, in constant proportion to the exhaust pressure, $P_e$, to provide a constant ratio of secondary air flow to exhaust flow for optimum oxidation of the undesirable exhaust constituents.

What is claimed is:

1. An air diverter valve for use with an internal combustion engine having an emission control system including an exhaust system for exhaust gas flow from said engine, an air pump, and a passage connecting said pump to said exhaust system for secondary air flow thereto, said valve comprising:

a housing having an inlet port connected to said passage and a discharge port opening to the atmosphere and further having a cylindrical bore portion therebetween;

valve means including a rectangular plate rotatably disposed in said bore portion and having edge portions adjacent to and abutting the cylindrical interior of said bore portion, one of said edge portions traversing said discharge port for varying the discharge flow area therefrom, a rod pivotally connected at one end to said plate; and means for actuating said rod and plate, said means including an annular member adapted for registration with and secured to one end of said housing, said annular member having at least one aperture opening to the atmosphere, a first flexible diaphragm secured at its periphery between said annular member and said housing, a cover member secured to said annular member and having a port adapted for connection to said exhaust system, a second flexible diaphragm secured at its periphery between said cover member and said annular member, said diaphragms being centrally attached to said rod for moving said plate, an exhaust pressure chamber formed between said second diaphragm and said cover member, an atmospheric chamber formed between said first and second diaphragms within said annular member, and a pump pressure chamber formed between said housing and said first diaphragm and opening to said bore upstream of said rectangular plate;

whereby said actuating means senses the pump discharge pressure occurring in said pump pressure chamber and the exhaust pressure occurring in said exhaust pressure chamber, said pressures acting, respectively, on opposite sides of said first and second diaphragms, and whereby said actuating means moves said rod and rotates said plate to traverse said discharge port thereby controlling the amount of air diverted from said passage to the atmosphere to control said discharge pressure in said passage in a fixed relationship to said exhaust pressure to thereby proportion the amount of air flow from said pump through said passage to the exhaust system to the exhaust flow therethrough.

2. An air diverter valve for use with an internal combustion engine having an emission control system including an exhaust system for exhaust gas flow from said engine, an air pump, and a passage connecting said pump to said exhaust system for secondary air flow thereto, said air diverter valve comprising a housing forming a pump discharge pressure chamber having an inlet port adapted for connection to said passage and a discharge port opening to the atmosphere, a valve member associated with said discharge port for varying the discharge flow area from said pump pressure chamber, a rod connected to said valve member; an annular member adapted for registration with and secured to one end of said housing, said annular member having at least one aperture opening to the atmosphere, a first flexible diaphragm secured at its periphery between said annular member and said housing and responsive to the difference between the pump discharge pressure within said chamber and the atmospheric pressure within said annular member, a cover member secured to said annular member and having a port adapted for connection to said exhaust system, a second flexible diaphragm secured at its periphery between said cover member and said annular member and responsive to the difference between the exhaust pressure within said cover member and the atmospheric pressure within said annular member, said diaphragms being connected to said rod whereby said disphragms position said valve member to divert sufficient air from said passage through said discharge port to maintain the pressure in said passage in fixed proportion to the pressure in said exhaust system and thereby proportion the amount of air flow from said pump through said passage to the exhaust system to the exhaust flow through said exhaust system.

* * * * *